United States Patent
Bialick

(10) Patent No.: US 10,832,233 B2
(45) Date of Patent: Nov. 10, 2020

(54) METHOD AND SYSTEM FOR REVERSING A SELECTION OF A PAYMENT METHOD FOR A SPECIFIC TRANSACTION

(71) Applicant: CURVE 1 LIMITED, London (GB)

(72) Inventor: Shachar Bialick, London (GB)

(73) Assignee: CURVE 1 LIMITED, London (GB)

( * ) Notice: Subject to any disclaimer, the term of this patent is extended or adjusted under 35 U.S.C. 154(b) by 298 days.

(21) Appl. No.: 15/983,406

(22) Filed: May 18, 2018

(65) Prior Publication Data

US 2018/0336544 A1 Nov. 22, 2018

Related U.S. Application Data

(60) Provisional application No. 62/508,553, filed on May 19, 2017.

(51) Int. Cl.
*G06Q 20/22* (2012.01)
*G06Q 20/40* (2012.01)
(Continued)

(52) U.S. Cl.
CPC .......... *G06Q 20/227* (2013.01); *G06Q 20/20* (2013.01); *G06Q 20/202* (2013.01);
(Continued)

(58) Field of Classification Search
CPC ............... G06Q 20/202; G06Q 20/407; G06Q 20/3223; G06Q 20/227; G06Q 20/20; G06Q 20/403; G06Q 20/405
(Continued)

(56) References Cited

U.S. PATENT DOCUMENTS 6,999,943 B1 2/2006 Johnson et al.
7,702,577 B1 * 4/2010 Dickelman ............ G06Q 20/10
705/39
(Continued)

OTHER PUBLICATIONS

Search Report dated Jul. 5, 2018 for corresponding European Application No. 18173191.0.

*Primary Examiner* — Andrew Joseph Rudy
(74) *Attorney, Agent, or Firm* — Pearl Cohen Zedek Latzer Baratz LLP

(57) ABSTRACT

A method and a system for reselecting of a payment method of a plurality of payment methods associated with a consolidated payment device are provided. The method may include obtaining, at a remote server, a transaction request, responsive to initiation by a holder of a consolidated payment device, wherein the transaction request indicates a first payment method of said plurality of payment methods; authorizing the transaction request, following a process that may include, inter alia, verifying sufficient funds on the first payment method; receiving, at said remote server, a reselection request indicating a second payment method which is different than the first payment method; in a case that the transaction has not yet finalized, authorizing the transaction request with the second payment method and aborting the transaction with the first payment method; and in a case that the transaction has been finalized, authorizing the transaction request with the second payment method and initiating a cancel and refund process for the transaction with the first payment method.

18 Claims, 2 Drawing Sheets

(51) Int. Cl.
 *G06Q 20/20* (2012.01)
 *G06Q 20/32* (2012.01)
(52) U.S. Cl.
 CPC ....... *G06Q 20/3223* (2013.01); *G06Q 20/403* (2013.01); *G06Q 20/405* (2013.01); *G06Q 20/407* (2013.01)
(58) Field of Classification Search
 USPC .......................................................... 705/21
 See application file for complete search history.

(56) References Cited

U.S. PATENT DOCUMENTS

| | | | | |
|---|---|---|---|---|
| 8,341,046 | B2* | 12/2012 | Marchetti | G06Q 20/10 705/35 |
| 8,380,636 | B2* | 2/2013 | Smith, III | G06Q 20/382 705/65 |
| 8,732,077 | B2* | 5/2014 | Calman | G06Q 20/227 705/35 |
| 8,812,402 | B2* | 8/2014 | Evans | G06Q 20/105 705/16 |
| 8,849,703 | B2* | 9/2014 | Ramaratnam | G06Q 20/202 705/20 |
| 10,192,231 | B2* | 1/2019 | Oppenheim | G06Q 20/387 |
| 10,504,090 | B2* | 12/2019 | Royyuru | G06Q 20/3572 |
| 10,552,810 | B1* | 2/2020 | Ethington | G06Q 20/108 |
| 2011/0191149 | A1 | 8/2011 | Blackhurst et al. | |
| 2013/0117126 | A1 | 5/2013 | Coppinger | |
| 2014/0081838 | A1 | 3/2014 | Calman | |
| 2015/0088631 | A1 | 3/2015 | Mitchell | |
| 2017/0109746 | A1* | 4/2017 | Mohandas | G06Q 20/401 |

\* cited by examiner

METHOD AND SYSTEM FOR REVERSING A SELECTION OF A PAYMENT METHOD FOR A SPECIFIC TRANSACTION

CROSS-REFERENCE TO RELATED APPLICATIONS

This application claims the benefit of U.S. Provisional Patent Application No. 62/508,553 filed on May 19, 2017 which is incorporated herein by reference in its entirety.

FIELD OF THE INVENTION

The present invention relates generally to computerized payment methods, and more particularly to post-transaction amendments of payment method.

BACKGROUND OF THE INVENTION

Prior to setting forth the background of the invention, it may be helpful to set forth definitions of certain terms that will be used hereinafter.

The term "payment method" as used herein is defined broadly as any method payment that requires identification of the payer (e.g. not cash) and can include payments cards, bank accounts, credit lines, and other The term "consolidated payment device" as used herein is defined broadly as any consolidated payment device whether physical or not, that is associated with a plurality of payment methods and enables using any of the payment methods with which it is associated. A consolidated payment device may include, for example, a card, a phone or a payment wearable (e.g. ring, bracelet, keyring and the like).

As various payment methods being used in parallel by same holders, it becomes important to have the ability to consolidate them into a single device—a physical or virtual one.

In a consolidated payment device format, it is possible for payment device holder to use any of the plurality of payment methods associated with his or her consolidated payment device either by preselecting the specified payment method for the transaction or based on a specified order or other logic.

In some cases, it is required for a holder of such a consolidated payment device, to reverse his or her payment method selection after he or she already used the device. This can be due to a mistake (e.g., the holder did not realize they do not have sufficient funds on a particular payment method) or due to latency associated with payment method selection procedure that is inherent to consolidated payment device format.

It would be therefore advantageous to provide a system and a method that securely and elegantly enable a holder of a consolidated payment device to effectively "go back in time" and reverse his or her selection of the payment method of the plurality of payment methods associated with the consolidated payment device so a transaction that was already registered on one payment method is effectively registered and issued on another one.

SUMMARY OF THE INVENTION

In accordance with some embodiments of the present invention, a method and a system for reselecting of a payment method of a plurality of payment methods associated with a consolidated payment device (CPD) are provided herein. The method may include the following steps: obtaining, at a remote server, a transaction request, responsive to an initiation by a holder of a consolidated payment device, possibly but not necessarily, at a point of sale (POS), wherein the transaction request indicates a first payment device of said plurality of payment devices; authorizing the transaction request, following a process that include, inter alia, verifying sufficient funds on the first payment device; receiving, at said remote server, a reselection request indicating an second payment device which is different than the first payment device; in a case that the transaction has not yet finalized, authorizing the transaction request with the second payment device and aborting the transaction with the first payment device; and in a case that the transaction has been finalized, authorizing the transaction request with the second payment device and initiating a cancel and refund process for the transaction with the first payment device.

Advantageously, embodiments of the present invention are carried out in a manner that is totally transparent to the recipient of the payment initiated by the holder. Specifically, either a recipient or a merchant (if relevant) are unaware and need not do anything in order to implement the so-called "go back in time" feature in accordance with some embodiments of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
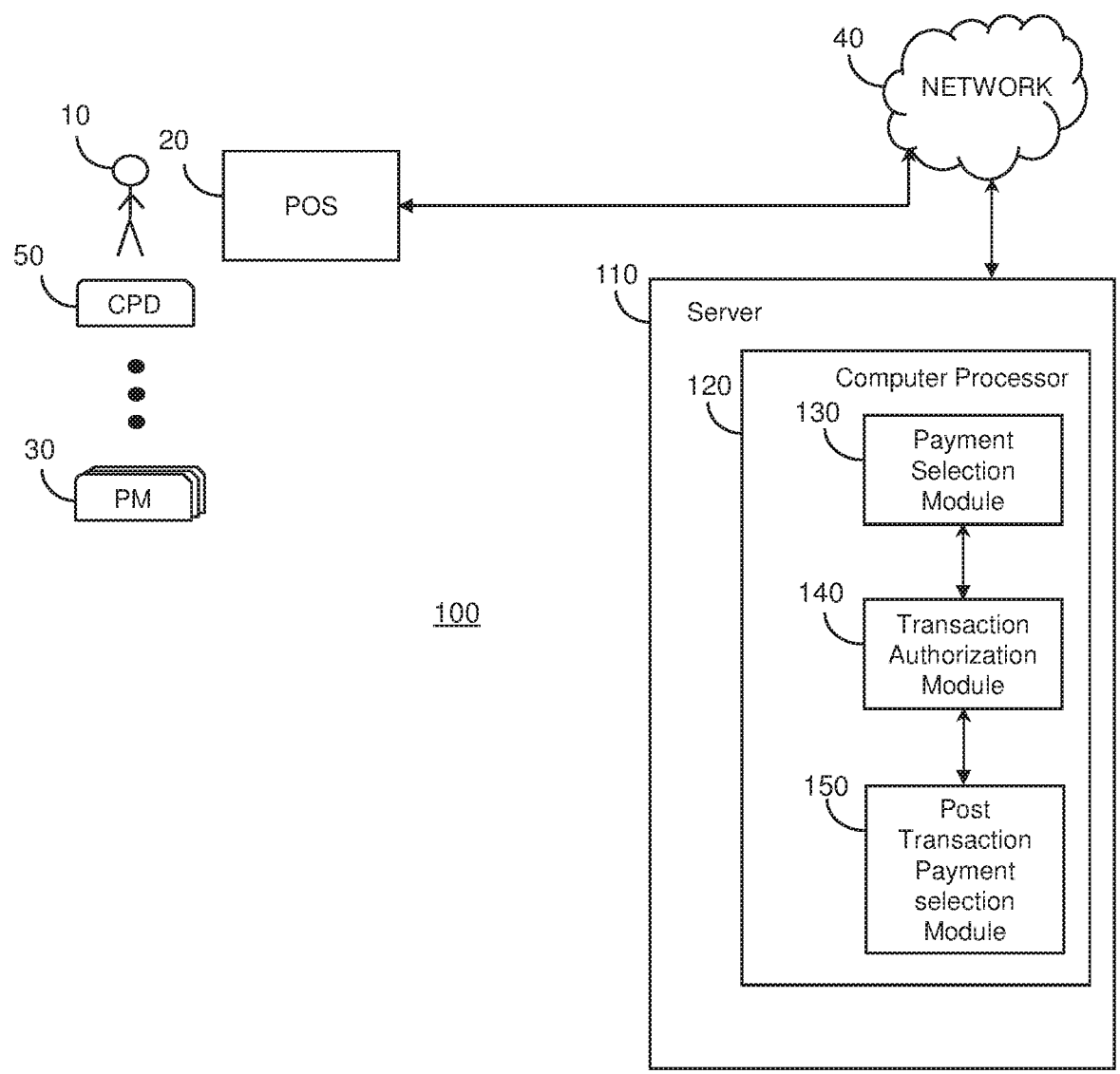
FIG. 1 is a block diagram illustrating non-limiting exemplary architecture of a system in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a block diagram illustrating non-limiting exemplary architecture of a system in accordance with some embodiments of the present invention. System 100 of reselecting of a payment method of a plurality of payment methods 30 associated with a consolidated payment device 50 is illustrated in high level architecture. System 100 may include: a payment selection module 130 implemented on a computer processor 120 at a remote server 110. Payment selection module 130 may be configured to obtain, a transaction request initiated by a holder 10 of a consolidated payment device 50 possibly but not necessarily at a point of sale (POS) 20 connected via a network 40 to server 110. It is understood that within network 40 many functionalities are carried out in order to achieve an operational payment method consolidating mechanism.

In accordance with some embodiments of the present invention, the transaction request indicates a first payment method of said plurality of payment methods (PM) 30. System 100 may further include a transaction authorization module 140, possibly implemented on computer processor 120, configured to authorize the transaction request, following a process that may include, inter alia, verifying sufficient funds on the first payment method.

System 100 may further include a post transaction payment selection module 150, possibly implemented on computer processor 120, configured to receive a reselection request indicating a second payment method of plurality of payment methods 30 which is different than the first payment method.

In accordance with some embodiments of the present invention, in a case that the transaction has not yet finalized, transaction authorization module 140 may be configured to authorize the transaction request with the second payment method and abort the transaction with the first payment method.

In accordance with some embodiments of the present invention, in a case that the transaction has been finalized, transaction authorization module 140 may be configured to authorize the transaction request with the second payment method and initiate a cancel and refund process for the transaction with the first payment method.

In accordance with some embodiments of the present invention the consolidated payment device may be a physical payment device capable of initiating a transaction at said POS but can also be applied for online transactions in which the so-called POS is a computer terminal on which the holder makes the transaction. The consolidated payment device may also be used to initiate transfer of funds to individuals or organizations. In this use case there is no merchant—just holder of CPD and a recipient.

In accordance with some embodiments of the present invention plurality of payment methods comprise at least one of: credit card, debit card, chip and PIN device; and mobile payment device, bank accounts, and any other payment method.

In accordance with some embodiments of the present invention the consolidated payment device is associated with a mobile communication device associated with the holder of said consolidated payment device, wherein the selection of the first payment method and the second payment method are carried out over said mobile communication device.

In accordance with some embodiments of the present invention the mobile communication device is one of: a wireless communication device, a smartphone, a tablet computer, and a lap top computer or the like. Alternatively, the consolidated payment device may be a virtual identifier of the holder that is unique to him or her. Thus, no physical item is required to serve as an identifier of all set of payment methods active and available for the holder.

Figure 2:
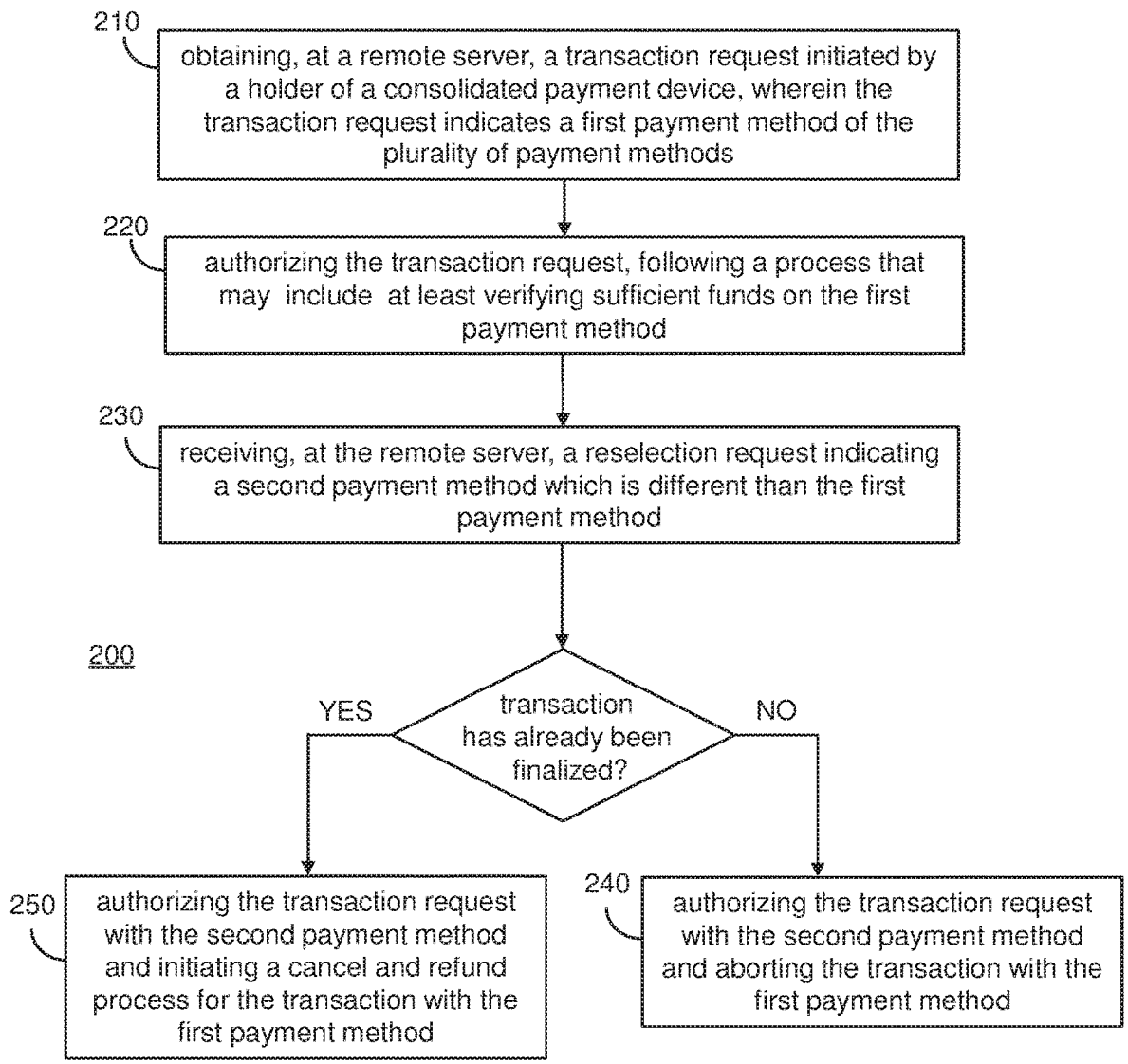
FIG. 2 is a high-level flowchart illustrating non-limiting exemplary method in accordance with embodiments of the present invention.

FIG. 2 is a high-level flowchart illustrating non-limiting exemplary method 200 for reselecting a payment method from a plurality of payment methods associated with a consolidated payment device. Method 200 may include the following steps: obtaining, at a remote server, a transaction request initiated by a holder of a consolidated payment device at a point of sale (POS), wherein the transaction request indicates a first payment method of said plurality of payment methods 210; authorizing the transaction request, following a process that may include, inter alia, verifying sufficient funds on the first payment method 220; receiving, at said remote server, a reselection request indicating an second payment method which is different than the first payment method 230; in a case that the transaction has not yet finalized, authorizing the transaction request with the second payment method and aborting the transaction with the first payment method 240; and in a case that the transaction has been finalized, authorizing the transaction request with the second payment method and initiating a cancel and refund process for the transaction with the first payment method 250.

In order to implement the method 200 and a non-transitory computer readable medium executing method 200 according to embodiments of the present invention, a computer processor may receive instructions and data from a read-only memory or a random-access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an optical fiber, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object-oriented programming language such as Java, Smalltalk, C++, Python or functional programming languages such as Scala and the like and conventional procedural programming languages, such as the "C" programming language or similar programming languages. The program code may execute entirely on the holder's computer, partly on the holder's computer, as a stand-alone software package, partly on the holder's computer and partly on a remote computer or entirely on the remote computer or server. In the latter scenario, the remote computer may be connected to the holder's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function (s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of reselecting of a payment method of a plurality of payment methods associated with a consolidated payment device, the consolidated payment device being associated with a plurality of payment methods and enabling a holder of the consolidated payment device to use any of the payment methods with which the consolidated payment device is associated, where a transaction has been finalized, the method comprising:

obtaining, at a remote server, a transaction request, responsive to initiation by the holder of the consolidated payment device, wherein the transaction request indicates a first payment method of said plurality of payment methods;

authorizing the transaction request, following a process that comprises verifying sufficient funds on the first payment method;

receiving, at said remote server, a reselection request indicating a second payment method which is different than the first payment method;
   and
   authorizing the transaction request with the second payment method and initiating a cancel and refund process for the transaction with the first payment method,
   wherein the obtaining, the authorizing, and the receiving are executed by a computer processor.

2. The method according to claim 1, wherein the consolidated payment device is a physical payment device capable of initiating a transaction at said POS.

3. The method according to claim 1, wherein the consolidated payment device is a virtual identifier of the holder.

4. The method according to claim 1, wherein the plurality of payment methods comprise at least one of: credit card, debit card, chip and PIN device; mobile payment device, bank account, and credit line.

5. The method according to claim 1, wherein the consolidated payment device is associated with a mobile communication device associated with the holder of said consolidated payment device, wherein the selection of the first payment device and the second payment device are carried out over said mobile communication device.

6. The method according to claim 5, wherein the mobile communication device is one of: a wireless communication device, a smartphone, a tablet computer, and a lap top computer.

7. A system of reselecting of a payment device of a plurality of payment methods associated with a consolidated payment device, the consolidated payment device being associated with a plurality of payment methods and enabling a holder of the consolidated payment device to use any of the payment methods with which the consolidated payment device is associated, where a transaction has been finalized, the system comprising:

a payment selection module implemented on a computer processor at a remote server, obtaining, a transaction request initiated by a holder of a consolidated payment method, wherein the transaction request indicates a first payment method of said plurality of payment methods;

a transaction authorization module, implemented on said computer processor, configured to authorize the transaction request, following a process that comprises verifying sufficient funds on the first payment method;
   and
   a post transaction payment selection module, implemented on said computer processor, configured to receive a reselection request indicating a second payment method which is different than the first payment method,
   and
   wherein the transaction authorization module is configured to authorize the transaction request with the second payment method and initiate a cancel and refund process for the transaction with the first payment method.

8. The system according to claim 7, wherein the consolidated payment device is a physical payment device capable of initiating a transaction at a point of sale (POS).

9. The system according to claim 7, wherein the consolidated payment device is a virtual identifier of the holder.

10. The system according to claim 7, wherein the plurality of payment methods comprise at least one of: credit card, debit card, chip and PIN device, mobile payment device, bank account, and credit line.

11. The system according to claim 7, wherein the consolidated payment device is associated with a mobile communication device associated with the holder of said consolidated payment device, wherein the selection of the first payment method and the second payment method are carried out over said mobile communication device.

12. The system according to claim 11, wherein the mobile communication device is one of: a wireless communication device, a smartphone, a tablet computer, and a lap top computer.

13. A non-transitory computer readable medium for reselecting of a payment method of a plurality of payment methods associated with a consolidated payment device, the consolidated payment device being associated with a plurality of payment methods and enabling a holder of the consolidated payment device to use any of the payment methods with which the consolidated payment device is associated, where a transaction has been finalized, the non-transitory computer readable medium comprising a set of instructions that when executed cause at least one computer processor to:

obtain, a transaction request initiated by a holder of a consolidated payment device, wherein the transaction request indicates a first payment method of said plurality of payment methods;

authorize the transaction request, following a process that comprises verifying sufficient funds on the first payment method;

receive, a reselection request indicating a second payment method which is different than the first payment method;

and authorize the transaction request with the second payment method and initiate a cancel and refund process for the transaction with the first payment method.

14. The non-transitory computer readable medium according to claim 13, wherein the consolidated payment device is a physical payment device capable of initiating a transaction at a point of sale (POS).

15. The non-transitory computer readable medium according to claim 13, wherein the consolidated payment device is a virtual identifier of the holder.

16. The non-transitory computer readable medium according to claim 13, wherein the plurality of payment methods comprise at least one of: credit card, debit card, chip and PIN device, mobile payment device, a bank account, and a credit line.

17. The non-transitory computer readable medium according to claim 13, wherein the consolidated payment device is associated with a mobile communication device associated with the holder of said consolidated payment device, wherein the selection of the first payment method and the second payment method are carried out over said mobile communication device.

18. The non-transitory computer readable medium according to claim 13, wherein the mobile communication device is one of: a wireless communication device, a smartphone, a tablet computer, and a lap top computer.

* * * * *